June 24, 1924.

R. L. LEONARD ET AL 1,498,632

RESILIENT WHEEL

Filed March 3, 1923

R. L. Leonard
T. M. Watson INVENTORS

BY Victor J. Evans

ATTORNEY

WITNESS:

Paul M. Hunt.

Patented June 24, 1924.

1,498,632

UNITED STATES PATENT OFFICE.

ROBERT L. LEONARD AND THOMAS M. WATSON, OF CHESTER, PENNSYLVANIA.

RESILIENT WHEEL.

Application filed March 3, 1923. Serial No. 622,570.

*To all whom it may concern:*

Be it known that we, ROBERT L. LEONARD and THOMAS M. WATSON, citizens of the United States, residing at Chester, in the county of Delaware and State of Pennsylvania, have invented new and useful Improvements in Resilient Wheels, of which the following is a specification.

This invention relates to vehicle wheels, particularly to those of the resilient type, and has for its object the provision of a wheel which has all the advantages of the ordinary pneumatic tire wheel without any of the disadvantages occurring in the use of the usual tire, the present device including the use of a pneumatic tire which is interposed in the intermediate portion of the wheel and which does not bear upon the ground so that punctures, blowouts and the like will be impossible.

An important and more specific object is the provision of a wheel of this character in which the hub portion is slidably associated with the outer portion so as to have free movement and to prevent binding of the parts when pressure is brought to bear upon the periphery of the wheel during its travel.

An additional object is the provision of a wheel of this character which will be simple and inexpensive in manufacture, highly efficient in use, durable in service and a general improvement in the art.

With the above and other objects and advantages in view, the invention consists in the details of construction to be hereinafter more fully described and claimed, and illustrated in the accompanying drawings in which:—

Figure 1:
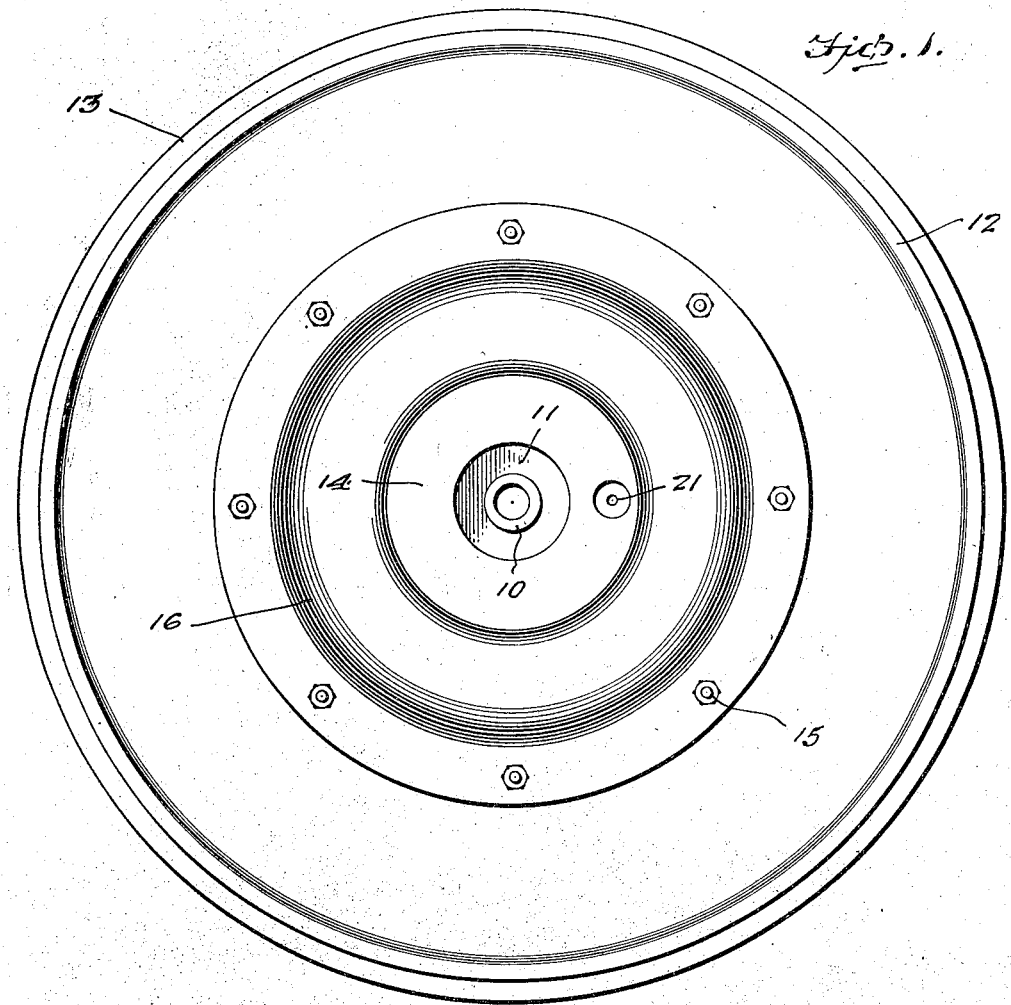
Figure 2:
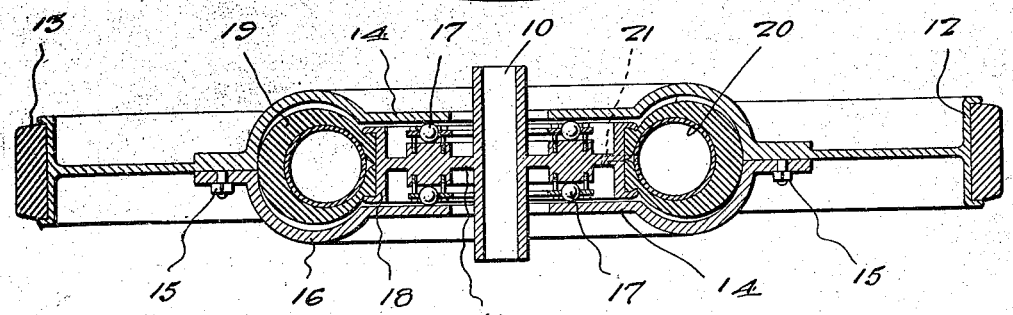

Figure 1 is a side elevation of a wheel constructed in accordance with the invention, parts being broken away and in section, and Figure 2 is a cross sectional view.

Referring more particularly to the drawings we have shown the wheel as comprising a hub portion 10 which may be formed for engagement upon either the back or front axle of an automobile or other vehicle, that is, it may be formed with the usual tapered hole for engagement upon a back axle or it may be provided with ball bearings for use on the front axle. This hub member is formed centrally with an outwardly extending flange 11.

The wheel further includes an outer portion 12 of ring like formation disposed in spaced concentric relation to the hub and having its outer periphery carrying a cushion tire 13. Secured upon the inner portion of this ring member 12 are side plates 14 which are held in place by suitable bolts 15 and these plates are of ring-like formation and have their intermediate portions curved outwardly as shown at 16. The inner portions of these plate members bear against the offset faces of the flange 11 and it may be preferable to provide a plurality of bearing balls 17 for the purpose of reducing friction.

Secured upon the outer periphery of the flange 11 is an ordinary rim 18 upon which is engaged a pneumatic tire 19 within which is disposed the usual inflatable tube 20 which is of course provided at some convenient point with a valve stem 21 of ordinary construction and to which access may be had from one side of the wheel or the other for the purpose of inflating the tube 20. This tire casing is located within the outwardly curved portions of the plate members 16 and is consequently fully enclosed thereby so as to fully protect the valve against injury from any cause.

In the use of the wheel it will be seen that the pneumatic tire will effectively absorb all the shocks and jars incident to road travel while at the same time the pneumatic tire will be protected against punctures, blowouts and the like as will be readily apparent from an inspection of the drawings. In case of any necessity which might necessitate removal of the tire it is to be noted that one of the plate members may be easily removed so as to give access to the tire.

From the foregoing description and a study of the drawings it will be apparent that we have thus provided a very simply constructed and consequently inexpensive vehicle wheel which will be easy riding and which will possess all the advantages incident to the use of the ordinary tire without being subject to punctures, blowouts and the like. It is also to be observed that the degree of inflation of the tire may be regulated in the ordinary manner so as to vary the sensitiveness of the wheel as may be found necessary when it is applied to cars which are heavier or lighter. Owing to the fact that the inflatable tire is entirely enclosed it should have an extremely long life and should be desirable in every way.

While we have shown and described the preferred embodiment of the invention it is of course to be understood that we reserve the right to make such changes in the form, construction and arrangement of parts as will not depart from the spirit of the invention or the scope of the subjoined claims.

Having described the invention we claim:—

1. A resilient wheel comprising a hub including a tubular central portion, a thickened intermediate portion and a rim all connected by integral webs, a pneumatic tire mounted on said rim, and an outer structure including a disk like element carrying a cushion tire on its outer periphery and having its inner portion formed with an opening of greater diameter than said tubular member and having its intermediate portion laterally offset and curved for the accommodation of the pneumatic tire, said outer member further including a side plate detachably mounted and offset outwardly for the accommodation of the pneumatic tire.

2. In a device of the character described, a hub including a tubular central portion, a thickened intermediate portion and a rim connected by integral webs, a pneumatic tire mounted upon the rim, ball cages secured upon opposite sides of said thickened portion and carrying balls, and an outer structure including a member of disk like formation and a ring member detachably secured thereto, the disk member and ring member having their intermediate portions outwardly offset for the accommodation of the pneumatic tire and having their inner portions bearing against said balls, their inner portions being formed with openings of greater diameter than the tubular central member of the hub.

In testimony whereof we affix our signatures.

ROBERT L. LEONARD.
THOMAS M. WATSON.